US009525353B2

United States Patent
Hayakawa et al.

(10) Patent No.: US 9,525,353 B2
(45) Date of Patent: Dec. 20, 2016

(54) SWITCHING POWER-SUPPLY DEVICE FOR PERFORMING CONTROL OF OUTPUT VOLTAGE SWITCHING OPERATION

(71) Applicant: Sanken Electric Co., LTD., Niiza-shi, Saitama (JP)

(72) Inventors: Akira Hayakawa, Niiza (JP); Masaaki Shimada, Niiza (JP); Yoshimichi Tadamasa, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 144 days.

(21) Appl. No.: 14/491,005

(22) Filed: Sep. 19, 2014

(65) Prior Publication Data

US 2016/0087519 A1   Mar. 24, 2016

(51) Int. Cl.
*H02M 3/335* (2006.01)
*H02M 1/32* (2007.01)
*H02M 1/36* (2007.01)
*H02M 1/00* (2006.01)

(52) U.S. Cl.
CPC .......... *H02M 3/33507* (2013.01); *H02M 1/32* (2013.01); *H02M 1/36* (2013.01); *H02M 3/33523* (2013.01); *H02M 2001/0006* (2013.01); *H02M 2001/0035* (2013.01)

(58) Field of Classification Search
CPC H02M 1/088; H02M 3/33507; H02M 3/3353; H02M 1/36; H02M 1/32; H02M 3/33523; H02M 2001/0006; H02M 2001/0035
USPC .... 363/21.02–21.18; 323/282–286, 222, 351
See application file for complete search history.

(56) References Cited

U.S. PATENT DOCUMENTS

| | | | | |
|---|---|---|---|---|
| 6,960,906 | B2* | 11/2005 | Yamashita | H02M 3/33523 323/275 |
| 7,265,999 | B2* | 9/2007 | Murata | H02M 3/33523 363/16 |
| 7,375,498 | B2* | 5/2008 | Yamamoto | H01M 10/486 320/136 |
| 8,194,427 | B2* | 6/2012 | Shimada | H02M 3/33507 363/49 |
| 8,242,765 | B2* | 8/2012 | Kunimatsu | H02M 3/156 323/283 |
| 8,295,062 | B2* | 10/2012 | Kawabe | H02M 3/33507 363/21.12 |
| 8,614,872 | B2* | 12/2013 | Nakamura | H02M 3/156 361/93.1 |

(Continued)

FOREIGN PATENT DOCUMENTS

JP   2008-211881 A   9/2008

*Primary Examiner* — Timothy J Dole
*Assistant Examiner* — Htet Z Kyaw
(74) *Attorney, Agent, or Firm* — Banner & Witcoff, Ltd.

(57) ABSTRACT

A switching power-supply device performs a control of an output voltage by switching operation of a switching element and has an integrated circuit including the switching element and a driving circuit for performing on-and-off control of the switching element. The integrated circuit includes an input terminal connected to the switching element, a voltage detection circuit, which detects a voltage of the input terminal, a timing control circuit, which controls a timing of detecting the voltage by the voltage detection circuit, and a control unit, which performs a control according to the voltage detected by the voltage detection circuit.

5 Claims, 3 Drawing Sheets

(56) References Cited

U.S. PATENT DOCUMENTS

| | | | | |
|---|---|---|---|---|
| 8,687,384 B2* | 4/2014 | Chen | ................ | H02M 3/33523 |
| | | | | 363/19 |
| 8,724,347 B2* | 5/2014 | Hosotani | ................ | H02M 1/36 |
| | | | | 363/21.04 |
| 8,953,348 B2* | 2/2015 | Sugawara | ........... | H02M 1/4225 |
| | | | | 323/207 |
| 9,030,849 B2* | 5/2015 | Yamashita | .................... | 323/285 |
| 9,136,767 B2* | 9/2015 | Sugahara | .......... | H02M 3/33523 |
| 2005/0189821 A1* | 9/2005 | Yamashita | .............. | H02M 1/36 |
| | | | | 307/130 |
| 2007/0133234 A1* | 6/2007 | Huynh | .............. | H02M 3/33507 |
| | | | | 363/20 |
| 2008/0290846 A1 | 11/2008 | Kanouda et al. | | |
| 2010/0053998 A1* | 3/2010 | Shimada | ........... | H02M 3/33507 |
| | | | | 363/21.01 |
| 2011/0175587 A1* | 7/2011 | Hosotani | ............. | H02M 3/3376 |
| | | | | 323/283 |
| 2013/0128623 A1* | 5/2013 | Hosotani | ........... | H02M 3/33523 |
| | | | | 363/21.01 |
| 2013/0170251 A1* | 7/2013 | Djenguerian | ........... | H02M 3/24 |
| | | | | 363/21.01 |
| 2015/0084580 A1* | 3/2015 | Nishimura | ........... | H02J 7/0036 |
| | | | | 320/107 |
| 2015/0280585 A1* | 10/2015 | Hayakawa | ........ | H02M 3/33515 |
| | | | | 363/21.13 |
| 2015/0303898 A1* | 10/2015 | Zhai | ........................ | H03K 7/08 |
| | | | | 327/109 |
| 2015/0340957 A1* | 11/2015 | Fang | ....................... | H02M 1/08 |
| | | | | 363/21.16 |
| 2016/0006358 A1* | 1/2016 | Chen | ................ | H02M 3/33507 |
| | | | | 363/21.16 |
| 2016/0294273 A1* | 10/2016 | Kawamura | ....... | H02M 3/33523 |

\* cited by examiner

SWITCHING POWER-SUPPLY DEVICE FOR PERFORMING CONTROL OF OUTPUT VOLTAGE SWITCHING OPERATION

TECHNICAL FIELD

This disclosure relates to a switching power-supply device performing a control of an output voltage by switching operation.

BACKGROUND ART

Such a switching power-supply device performing a control of an output 15 voltage by switching operation includes a switching element connected in series with an input power source and a primary winding of a transformer, and a switching control circuit for performing on-and-off control of the switching element to switch operation thereof, and the switching power-supply device is configured to rectify and smooth a secondary electromotive force generated by a secondary winding of the transformer and thus to output a direct voltage.

Also, a switching power-supply device in which an integrated circuit is provided separate from a switching element to control the switching element is described in JP 2008-211881 A.

SUMMARY

As a switching power-supply device, there is known a switching power-supply device in which a control circuit including a switching element and a driving circuit for driving the switching element is constructed as an integrated circuit (IC). The control circuit is provided with a plurality of terminals to realize various functions, but products with a reduced number of terminals are also appeared, and a control circuit which can realize many functions with a smaller number of terminals is required.

In the switching power-supply device described in JP 2008-211881 A, reduction of the number of terminals has not been considered.

This disclosure has been made with consideration of the above and provides a switching power-supply device which can realize many functions with a smaller number of terminals.

A switching power-supply device according to this disclosure is a switching power-supply device performing a control of an output voltage by switching operation of a switching element, the switching power-supply device having an integrated circuit including the switching element and a driving circuit for performing on-and-off control of the switching element, wherein the integrated circuit includes an input terminal connected to the switching element, a voltage detection circuit which detects a voltage of the input terminal, a timing control circuit which controls a timing of detecting the voltage by the voltage detection circuit, and a control unit which performs a control according to the voltage detected by the voltage detection circuit.

According to this disclosure, a switching power-supply device which can realize many functions with a smaller number of terminals can be provided.

DESCRIPTION OF EMBODIMENTS

Embodiments of this disclosure will be described with reference to the drawings.

Figure 1:
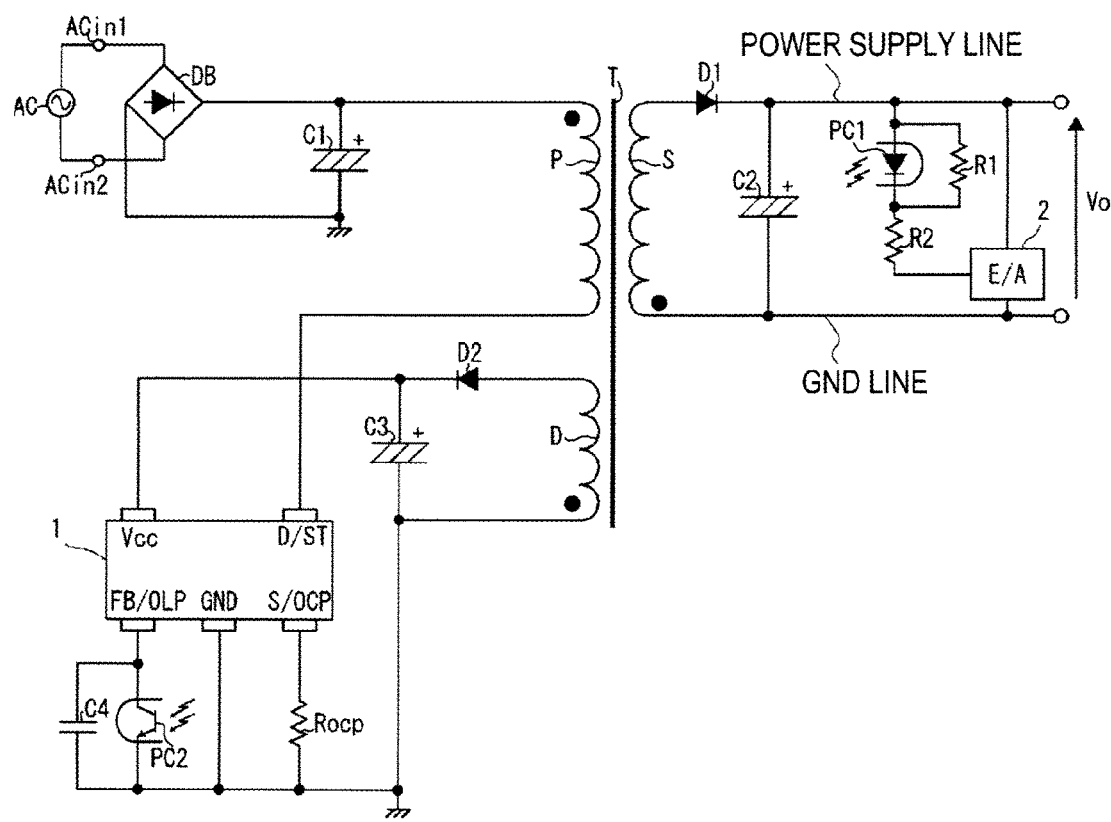
FIG. 1 is a view showing a configuration of a switching power-supply device according to an embodiment of this disclosure.

Referring to FIG. 1, a switching power-supply device according to an embodiment of this disclosure includes a rectifier circuit DB, smoothing capacitors C1, C2 and C3, a transformer T, a controller IC 1, which is an integrated circuit, rectifier diodes D1 and D2, an error amplifier (E/A) 2, an light emitting diode PC1 and a right receiving transistor PC2, which constitute a photo-coupler, a current detection resistor Rocp, resistors R1 and R2, and a capacitor C4.

A commercial alternating current power source AC is connected to alternating current input terminals ACin1 and ACin2 of the rectifier circuit DB, which has a diode bridged thereto. An alternating voltage inputted from the commercial alternating current power source AC is full-wave-rectified by and outputted from the rectifier circuit DB.

The smoothing capacitor C1 is connected between a rectified output positive terminal and a rectified output negative terminal of the rectifier circuit DB. In addition, the rectified output negative terminal of the rectifier circuit DB is connected to a grounding terminal. Therefore, the alternating voltage supplied from the commercial alternating current power source AC is rectified and smoothed by the rectifier circuit DB and the smoothing capacitor C1, and then direct voltage is obtained.

The controller IC 1 is equipped therein with a switching element, such as a power MOSFET (Metal Oxide Semiconductor Field Effect Transistor), and a driving circuit for performing on-and-off control (switching control) of the switching element.

The controller IC 1 includes a D/ST (MOSFET drain/stating current input) terminal, an S/OCP (MOSFET source/overcurrent protection) terminal, a Vcc (IC power-source voltage input) terminal, a FB/OLP (feedback signal input/overload protection signal input) terminal, and a GND terminal.

The transformer T which supplies an electric power from a primary side (input side) to a secondary side (load side) is configured by a primary winding P, an auxiliary winding D and a secondary winding S. The rectified output positive terminal of the rectifier circuit DB is connected to one end of the primary winding P of the transformer T, and the other end of the primary winding P of the transformer T is connected to the D/ST terminal of the controller IC 1. The S/OCP terminal of the controller IC 1 is connected to the grounding terminal via the resistor Rocp.

By performing on-and-off control of the switching element equipped in the controller IC 1, an electric power given to the primary winding P of the transformer T is transmitted to the secondary winding S of the transformer T, and thus a current is generated in the second winding S of the transformer T. Also, the current detection resistor Rocp is connected as a resistor for detecting, as a voltage signal $V_{ocp}$, a current ID flowing through the switching element equipped in the controller IC 1.

The controller IC 1 has an overcurrent protection (OCP) function of limiting an electric power supplied to the secondary side, if the voltage signal $V_{ocp}$ corresponding to the current flowing through the switching element is equal to or greater than a preset overcurrent threshold.

The smoothing capacitor C2 is connected between both terminals of the secondary winding S of the transformer T via the rectifier diode D1. A voltage induced in the secondary winding S of the transformer T is rectified and smoothed by the rectifier diode D1 and the smoothing capacitor C2, and then a voltage between terminals of the smoothing capacitor C2 is outputted as an output voltage Vo from an output terminal. Meanwhile, a line, which is connected to a positive terminal of the smoothing capacitor C2, becomes a power supply line, whereas a line, which is connected to a negative terminal of the smoothing capacitor C2, becomes a GND line connected to the grounding terminal.

The error amplifier (E/A) 2 is connected between the power line and the GND line. The error amplifier 2 is connected between the power supply line and the GND line to control a current flowing through the light emitting diode PC1 of the photo-coupler according to a difference between the output voltage Vo and a normal voltage. Also, the FB/OLP terminal of the controller IC 1 is connected to the grounding terminal via the light receiving transistor PC2 and the capacitor C4, which are connected in parallel to each other.

Thus, a feedback (FB) signal according to the output voltage is sent from the light emitting diode PC1 to the light receiving transistor PC2 on the primary side and thus is inputted, as a voltage signal $V_{FB}$, to the FB/OLP terminal of the controller IC 1.

The controller IC 1 controls duty ratios of an on period and an off period of the switching element on the basis of the voltage signal $V_{FB}$ inputted to the FB/OLP terminal, thereby controlling an amount of electric power to be supplied to the secondary side.

The smoothing capacitor C3 is connected between both terminals of the auxiliary winding D of the transformer T via the rectifier diode D2. A connection point between the rectifier diode D2 and the smoothing capacitor C3 is connected to the Vcc terminal of the controller IC 1. Thus, a voltage generated in the auxiliary winding D is rectified and smoothed by the rectifier diode D2 and the smoothing capacitor C3 and then is supplied, as an IC power-source voltage Vcc, to the Vcc terminal of the controller IC 1.

Figure 2:
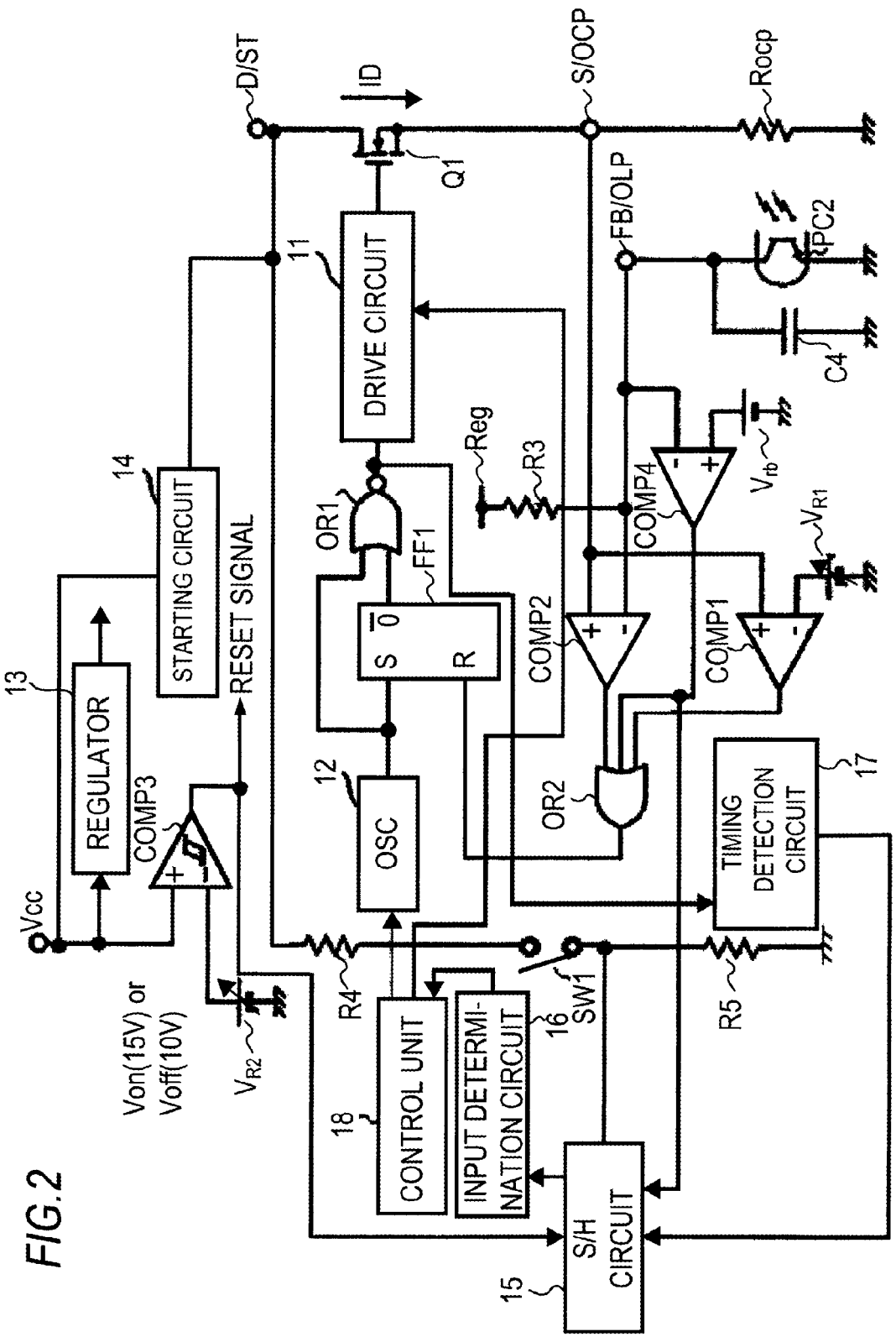
FIG. 2 is a view showing a circuit configuration example of a controller IC 1 shown in FIG. 1.

FIG. 2 is a view showing a circuit configuration example of the controller IC 1 shown in FIG. 1.

The controller IC 1 includes a switching element Q1, which is configured by a N-channel type power MOSFET or the like, a drive circuit 11, an OSC (internal oscillator) 12, a regulator 13, a starting circuit 14, a sample hold (S/H) circuit 15, an input determination circuit 16, a timing detection circuit 17, a control unit 18, voltage detection resistors R4 and R5, a switch SW1, variable voltages $V_{R1}$ and $V_{R2}$, a reference voltage $V_{rb}$, OR circuits OR1 and OR 2, a flip-flop FF1, comparators COMP1-COMP4, and a resistor R3.

To the D/ST terminal, a drain terminal of the switching element Q1, the starting circuit 14 and a serial circuit, which is configured by resistors R4 and R5 to detect a voltage of the D/ST terminal, and an end portion of the serial circuit opposite an end portion thereof connected to the D/ST terminal is connected to the ground terminal. The serial circuit configures a voltage detection circuit for detecting a voltage of the D/ST terminal.

The starting circuit 14 is connected between the Vcc terminal and a connection point between the D/ST terminal and the drain of the switching element Q1. When a direct voltage is inputted to the D/ST terminal, the starting circuit 14 starts to charge the smoothing capacitor C3 connected to the Vcc terminal, thereby increasing a power-source voltage Vcc inputted to the Vcc terminal.

The regulator 13, which is connected to the Vcc terminal, is operated by an electric power supplied from the Vcc terminal and generates a power-source voltage required to operate each part of the controller IC 1 to supply the power-source voltage to each part.

A source terminal of the switching element Q1 is connected to the S/OCP terminal. The drive circuit 11 is connected to a gate terminal of the switching element Q1. An output signal of the OR circuit OR1 is inputted to the drive circuit 11. The drive circuit 11 is a driving circuit intended to output a drive signal for the switching element Q1 on the basis of the output signal of the OR circuit OR1.

An output signal of the OSC 12 and an output signal of an inverted output terminal Q− of the flip-flop FF1 are inputted to an input terminal of the OR circuit OR1. An output of the OSC 12 is connected to an S terminal of the flip-flop FF1, and an output of the OR circuit OR2 is connected to an R terminal of the flip-flop FF1.

A pulse width of a clock signal outputted from the OSC 12 is set to be smaller than a minimum ON time width of the switching element Q1. The flip-flop FF1 serves as a PWM latch circuit. Thus, if the flip-flop FF1 is set so that the output signal of the inverted output terminal Q− is a low level while the output signal of the OSC 12 is a L level (a state where the clock signal is not outputted), a high level output signal from the OR circuit OR1 is inputted to the drive circuit 11, thereby turning the switching element Q1 on.

The S/OCP terminal is connected to each of a non-inverted terminal of the comparator COMP 1 and a non-inverted terminal of the comparator COMP 2. The comparator COMP 1 is an OCP comparator intended to detect an overcurrent, and the variable voltage $V_{R1}$, which is set to an overcurrent threshold during a normal operation, is connected to an inverted terminal thereof.

During a normal operation, when the voltage signal $V_{ocp}$ of the S/OCP terminal corresponding to the drain current ID flowing through the switching element Q1 is equal to or greater than the overcurrent threshold ($V_{R1}$), a high level output signal is outputted from the comparator COMP 1. As the output signal of the comparator COMP1 becomes such a high level, the flip-flop FF1 is reset by the OR circuit OR2 so that the output signal of the OR circuit OR1 becomes a low level, thereby turning the switching element Q1 off.

The comparator COMP 2 is a current sense converter intended to perform feedback control for controlling duty ratios of the switching element Q1 on the basis of the FB signal inputted as the voltage signal $V_{FB}$ to the FP/OLP terminal.

The inverted input terminal of the comparator COMP2 is connected to the FB/OLP terminal, which is connected to a reference voltage Reg via the resistor R3. In the comparator COMP2, the voltage signal $V_{ocp}$ and the voltage signal $V_{FB}$ are compared to each other, and if the voltage signal $V_{ocp}$ is equal to or greater than the voltage signal $V_{FB}$, a H level output signal is outputted from the comparator COMP2.

As the output signal of the comparator COMP2 becomes such a H level, the flip-flop FF1 is reset by the OR circuit OR2 so that the output signal of the OR circuit OR1 becomes a low level, thereby turning the switching element Q1 off. Thus, the feedback control for controlling duty ratios of the switching element Q1 is performed on the basis of the FB signal.

The comparator COMP4 is a bust comparator intended to bust-oscillate a normal switching operation by comparing the FB signal voltage, which is inputted as the voltage signal $V_{FB}$ to the FB/OLP terminal, with the reference voltage $V_{rb}$, which is connected to a non-inverted terminal thereof.

The reference voltage $V_{rb}$ is set to a value of the FB signal voltage at light loads. The inverted input terminal of the comparator COMP4 is connected to the FB/OLP terminal, which is connected to a reference voltage Reg via the resistor R3. In the comparator COMP4, the voltage signal $V_{rb}$ and the voltage signal $V_{FB}$ are compared to each other, and if the voltage signal $V_{rb}$ is equal to or greater than the voltage signal $V_{FB}$, a high level output signal is outputted from the comparator COMP4.

As the output signal of the comparator COMP4 becomes such a high level, the flip-flop FF1 is reset by the OR circuit OR2 so that the output signal of the OR circuit OR1 becomes a low level, thereby turning the switching element Q1 off. Thus, a burst oscillation control for keeping the switching element Q1 turned off during a predetermined period is performed on the basis of the FB signal.

Due to such a burst oscillation control, the switching power-supply device intermittently performs switching operation for controlling an output voltage by on-and-off control of the switching element Q1, and thus can operate in a standby mode allowing reduction of power consumption.

The comparator COMP 3 is a comparison circuit intended to compare the power-source voltage Vcc, which is inputted to the Vcc terminal, to the variable voltage $V_{R2}$. The comparator COMP3 has a non-inverted input terminal connected to the Vcc terminal and an inverted input terminal connected to the variable voltage $V_{R2}$. The comparator COMP3 outputs a high level signal to the S/H circuit 15 when the power-source voltage Vcc is greater than the variable voltage $V_{R2}$. When the power-source voltage Vcc is equal to or smaller than the variable voltage $V_{R2}$/operation of the controller IC 1 is stopped.

The variable voltage $V_{R2}$ is set to either one of a first reference voltage Von (e.g., 15V), which is intended to initiate operation of the controller IC 1, and a second reference voltage Voff (e.g., 10V), which is lower than the first reference voltage Von and intended to stop operation of the controller IC 1.

The S/H circuit 15 is connected to an output terminal (a connection point between the resistor R4 and the resistor R5) of the voltage detection circuit configured by the resistor R4 and the resistor R5. The switch SW1 is connected to the resistor R4 and the resistor R5. The S/H circuit 15 is configured to perform on-and-off control of the switch SW1 and to hold a voltage, is detected on the resistor R4 and the resistor R5, in a capacitor inside thereof when turning the switch SW1 on.

The S/H circuit 15 serves as a timing control circuit for controlling a timing, at which the voltage detection circuit detects a voltage of the D/ST terminal, by controlling a timing of turning the switch SW1 on.

A signal outputted from the comparator COMP3, a signal outputted from the timing detection circuit 17 and a signal outputted from the comparator COMP4 are inputted to the S/H circuit 15. The S/H circuit 15 turns the switch SW1 on when each signal inputted thereto becomes a high level and thus holds the voltage of the D/ST terminal detected by the voltage detection circuit.

Figure 3:
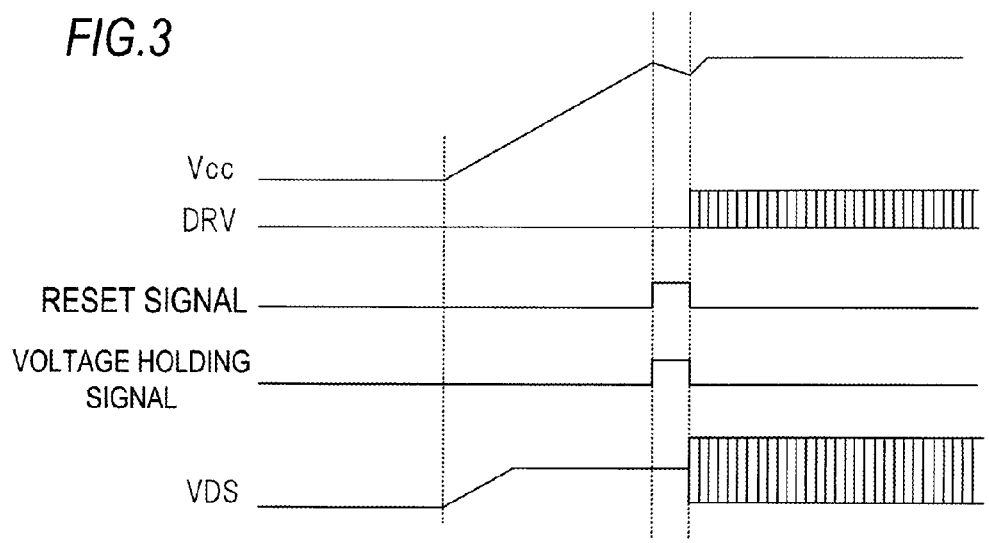
FIG. 3 is a timing chart explaining an operation when detecting a voltage of a D/ST terminal by a signal outputted from a comparator COMP3.

FIG. 3 is a timing chart explaining an operation when the S/H circuit 15 holds the voltage of the D/ST terminal by the signal outputted from the comparator COMP3. In FIG. 3, "Vcc" represents a power-source voltage inputted to the Vcc terminal. "DRV" represents a drive signal outputted from the drive circuit 11. "RESET SIGNAL" represents an output signal of the comparator COMP3. "VOLTAGE HOLDING SIGNAL" represents a driving signal for the switch SW1. "VDS" represents a drain-to-source voltage of the switching element Q1.

As shown in FIG. 3, when the switching power-supply device is started and then an input voltage inputted to the Vcc terminal is increased, a high level reset signal is inputted to the S/H circuit 15 at a timing at which the input voltage reaches the variable voltage $V_{R2}$ (e.g., 15V). The S/H circuit 15 turns the switch SW1 on at a timing at which the high level reset signal is inputted thereto and then holds a voltage of the D/ST terminal detected by the serial circuit configured by the resistor R4 and the resistor R5.

Switching operation of the switching element Q1 is not started yet immediately after the power-source voltage Vcc starts to be increased. Therefore, during a period until switching operation of the switching element Q1 is started after the power-source voltage Vcc is increased so that a reset signal for power-on-reset is outputted by the comparator COMP3, a voltage of the D/ST terminal can be detected and held, and as a result, a magnitude of an input voltage inputted to the D/ST terminal can be precisely determined.

To the timing detection circuit 17 shown in FIG. 2, an output signal of the OR circuit OR1 is inputted. The timing detection circuit 17 detects a timing, at which the drive circuit 11 turns the switching element Q1 from on to off, on the basis of the output signal of the OR circuit OR1.

Also, the timing detection circuit 17 outputs a high level signal to the S/H circuit 15 at a timing after a predetermined period has passed from the detected timing, and outputs a low level signal to the S/H circuit 15 at the other timings.

The predetermined period is set to a period required for completing electric power transferring of the voltage of the D/ST terminal at an instant where the switching element Q1 is turned from on to off, in the secondary winding S of the transformer T. But, a peak voltage is excluded in setting such a period.

Figure 4:
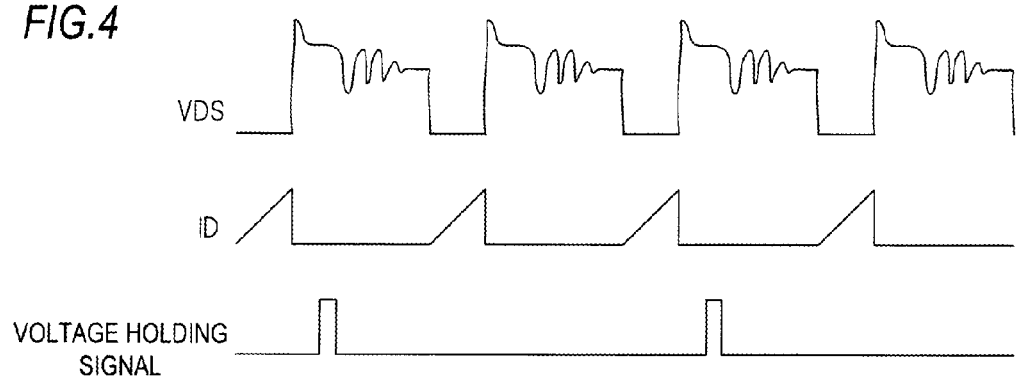
FIG. 4 is a timing chart explaining an operation when detecting a voltage of the D/ST terminal by a signal outputted from a timing detection circuit 17.

FIG. 4 is a timing chart explaining an operation when the S/H circuit 15 holds the voltage of the D/ST terminal by a signal outputted from the timing detection circuit 17. In FIG. 4, "VDS" represents a drain-to-source voltage of the switching element Q1. "ID" represents a voltage signal $V_{ocp}$ of the S/OCP terminal corresponding to the drain current ID flowing through the switching element Q1. "VOLTAGE HOLDING SIGNAL" represents an output signal of the timing detection circuit 17.

As shown in FIG. 4, in a period during which switching operation of periodically turning the switching element Q1 on-and-off is performed, when the switching element Q1 is turned on, the drain current ID is increased and the drain-to-source voltage of the switching element Q1 has a small value.

On the other hand, when the switching element Q1 is off, the drain current ID becomes substantially zero and the drain-to-source voltage of the switching element Q1 is increased and, after a predetermined period has passed, is stabilized and thereafter decayed. In such periods in which the drain-to-source voltage has been stabilized, the voltage holding signal becomes a high level at a rate of once every a plurality of periods (two periods in an example of FIG. 4).

In this way, since the drain-to-source voltage after the switching element Q1 is turned off and then a predetermined period is elapsed is held in the S/H circuit 15 at every predetermined periods, it is possible to determines a magnitude of an input voltage inputted to the D/ST terminal during a normal operation.

Alternatively, the timing detection circuit 17 may be configured to output a high level signal after a predetermined period has passed from starting of each period during which the switching element Q1 has turned off. As shown in FIG. 4, if a cycle at which the voltage holding signal becomes such a high level is set to be longer than a switching cycle, power consumption can be reduced.

Figure 5:
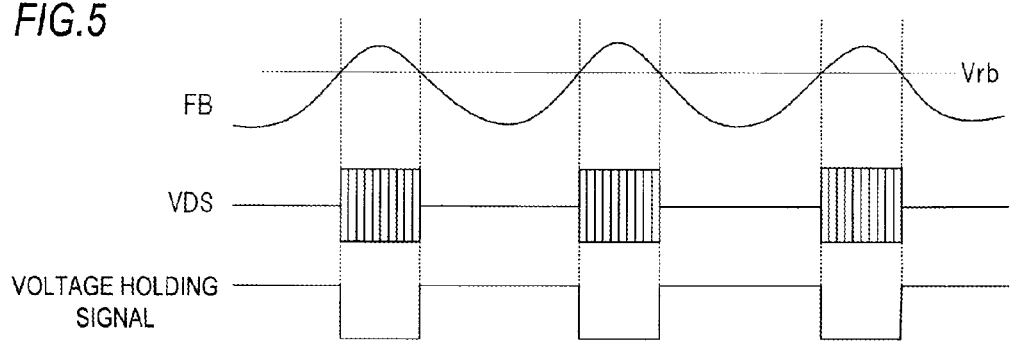
FIG. 5 is a timing chart explaining an operation when detecting a voltage of the D/ST terminal by a signal outputted from a comparator COMP4.

FIG. 5 is a timing chart explaining an operation when the S/H circuit 15 holds the voltage of the D/ST terminal by the signal outputted from the comparator COMP4. In FIG. 5, "FB" represents a FB signal voltage inputted as the voltage signal $V_{FB}$ to the FP/OLP terminal. "VDS" represents a drain-to-source voltage of the switching element Q1. "Voltage Holding Signal" represents an output signal of the comparator COMP4.

When the FB signal voltage is equal to or greater than the voltage signal $V_{rb}$, a low level voltage holding signal is outputted from the comparator COMP4. In this case, also, since a low level signal is inputted to a reset terminal of the flip-flop FF1, the flip-flop FF1 is not reset and the switching element Q1 is controlled to be turned on-and-off according to an oscillation frequency of the OSC 12.

If the FB signal voltage is smaller than the voltage signal $V_{rb}$, a high level voltage holding signal is outputted from the comparator COMP4 and a voltage of the D/ST terminal is held in the S/H circuit 15. In this case, also, since a high level signal is inputted to the reset terminal of the flip-flop FF1, the flip-flop FF1 is reset and the switching element Q1 is kept in turn off.

In this way, in a switching off state during a standby period in which switching operation of the switching element Q1 is not performed, the S/H circuit 15 detects the voltage of the D/ST terminal. According to this configuration, a circuit loss due to voltage detection can be reduced, as compared to the case where the voltage of the D/ST terminal is detected and held at a predetermined cycle during switching operation periods as in FIG. 4.

Alternatively, the S/H circuit 15 does not always detect but may intermittently detect the voltage of the D/ST terminal in the switching off state during the standby period in which switching operation of the switching element Q1 is not performed. Also, the S/H circuit 15 may be configured to detect the voltage only once in this state.

The input determination circuit 16 shown in FIG. 2 generates a signal according to the voltage held by the S/H circuit 15 and outputs the generated signal to the control unit 18.

For example, the input determination circuit 16 outputs a first signal if the voltage held by the S/H circuit 15 is equal to or smaller than a threshold TH1, outputs a second signal if the voltage held by the S/H circuit 15 is greater than the threshold TH1 but equal to or smaller than a threshold TH2 (>the threshold TH1), and outputs a third signal if the voltage held by the S/H circuit 15 is greater than the threshold TH2.

For example, the threshold TH1 may be set to a value (e.g., 100V) intended to determine whether the commercial alternating current power source AC is 100V system voltage or 200V system voltage. The threshold TH2 may be set to a value considered necessary to protect the switching element Q1 according to a withstand voltage of the switching element Q1.

The control unit 18 controls the OSC 12 and the drive circuit 11. The control unit 18 changes various control contents in the integrated circuit, including control contents of the switching element Q1 by the drive circuit 11, in response to signals inputted from the input determination circuit 16.

For example, the control unit 18 changes control contents of the switching frequency (such as the oscillation frequency of the OSC 12 and a switching timing of operating point of a frequency reduction function), an on-and-off switching timing for soft-switching by the drive circuit 11 and the like, when the first signal is inputted thereto and also when the second signal is inputted thereto.

Also, the control unit 18 changes the drive circuit 11 to an off driving state when the third signal is inputted thereto. By doing so, the switching element Q1 is turned off. Thus, when an overvoltage exceeding the withstand voltage is inputted to the D/ST terminal, the switching element Q1 can be protected.

In addition, the control unit 18 sets control contents when the first signal (signal indicating that a power source is 100V) or the second signal (signal indicating that a power source is 200V) is inputted thereto, and performs a control required to protect the switching element Q1 against an overvoltage only when the third signal (signal indicating that an overvoltage is inputted) is inputted thereto.

Next, operations of the switching power-supply device shown in FIG. 1 will be described.

When an electronic apparatus equipped with the switching power-supply device shown in FIG. 1 is connected to a commercial alternating current power source AC, a direct voltage is inputted to the D/ST terminal. As the direct voltage is inputted, the starting circuit 14 increase a voltage of the Vcc terminal, and if an output of the comparator COMP3 becomes a high level, a voltage of the D/ST terminal detected by the resistors R4 and R5 is held in the S/H circuit 15.

The voltage held in the S/H circuit 15 is inputted to the input determination circuit 16, and the input determination circuit 16 compares the inputted voltage with the thresholds TH1 and TH2 and then outputs a signal according to the comparison result to the control unit 18. The control unit 18 sets control contents in response to the signal inputted thereto.

Then, when switching operation of the switching element Q1 by the drive circuit 11 is started according to the control contents set by the control unit 18, a voltage of the D/ST terminal detected by the resistors R4 and R5 is held in the S/H circuit 15 at every timing after the switching element Q1 has been turned off and then a predetermined period has passed.

The voltage held in the S/H circuit 15 is inputted to the input determination circuit 16 and the input determination circuit 16 compares the inputted voltage with the thresholds TH1 and TH2 and then outputs a signal according to the comparison result to the control unit 18. The control unit 18 performs a control required to protect the switching element if the third signal is inputted thereto.

Also, at a timing where an output signal of the comparator COMP4 becomes a high level, a voltage of the D/ST terminal detected by the resistors R4 and R5 is held in the S/H circuit 15. The voltage held in the S/H circuit 15 is inputted to the input determination circuit 16 and the input determination circuit 16 compares the inputted voltage with the thresholds TH1 and TH2 and then outputs a signal according to the comparison result to the control unit 18. The control unit 18 performs a control required to protect the switching element Q1 if the third signal is inputted thereto.

Alternatively, in a standby state, the timing detection circuit 17 may be stopped. Thus, during switching operation in a standby mode, a voltage of the D/ST terminal by the resistors R4 and R5 is not to be detected, thereby reducing power consumption.

As described above, according to the switching power-supply device of FIG. 1, the voltage detection circuit (resistors R4 and R5) for detecting a voltage inputted to the D/ST terminal is provided inside the integrated circuit. Therefore, various controls according to variations in the input voltage may be performed without providing the integrated circuit with a dedicated terminal for detecting the input voltage and inputting the detected voltage to the integrated circuit. As a result, a terminal for detecting the input voltage can be allocated as a terminal having another function, thereby realizing multi-functions by a smaller number of terminals.

Also, according to the switching power-supply device of FIG. 1, since the voltage of the D/ST terminal is not always detected and a detection timing thereof are controlled by the S/H circuit 15, a circuit loss can be reduced as compared to a configuration in which a voltage inputted to the integrated circuit is always detected.

In the switching power-supply device of FIG. 1, the control unit 18 may control so as not to perform a switching control during a predetermined period after an alternating voltage has been supplied from the commercial alternating current power source AC and a direct voltage has been inputted to the D/ST terminal. According to this configuration, a period required to detect a voltage of the D/ST terminal can be sufficiently ensured.

In the foregoing, although specific embodiments of this disclosure have been explained, such embodiments are only examples, and various changes and modifications thereof may be made without departing from the spirit and the scope of the disclosure.

As described above, the followings are disclosed herein.

The disclosed switching power-supply device is a switching power-supply device performing a control of an output voltage by switching operation of a switching element, the switching power-supply device having an integrated circuit including the switching element and a driving circuit for performing on-and-off control of the switching element, wherein the integrated circuit includes an input terminal connected to the switching element, a voltage detection circuit which detects a voltage of the input terminal, a timing control circuit which controls a timing of detecting the voltage by the voltage detection circuit, and a control unit which performs a control according to the voltage detected by the voltage detection circuit.

In the disclosed switching power-supply device, the integrated circuit further includes a power source terminal for inputting a power-source voltage, wherein the timing control circuit causes the voltage detection circuit to detect the voltage during a period from when the power-source voltage inputted to the power source terminal has exceed a threshold to when switching operation of periodically turning the switching element on-and-off is started.

In the disclosed switching power-supply device, the timing control circuit causes the voltage detection circuit to detect the voltage at a preset periodic timing in a period, during which the switching element has been turned off while switching operation of periodically is being turning the switching element on-and-off.

In the disclosed switching power-supply device, the timing control circuit causes the voltage detection circuit to detect the voltage in a period, during which switching operation of periodically turning the switching element on-and-off has been stopped while the switching operation is being intermittently performed.

The invention claimed is:

1. A switching power-supply device performing a control of an output voltage by a switching operation of a switching element, the switching power-supply device having an integrated circuit comprising the switching element and a driving circuit for performing on-and-off control of the switching element, wherein the integrated circuit comprises:
   an input terminal connected to the switching element;
   a voltage detection circuit, which detects an input voltage of the input terminal;
   a timing control circuit, which controls a detection timing of detecting the voltage by the voltage detection circuit; and
   a control unit, which performs a control according to the voltage detected by the voltage detection circuit,
   wherein the voltage detection circuit is connected to the input terminal and the switching element,
   wherein the detection timing is a timing where the switching element is being turned off, and
   wherein the timing control circuit controls the voltage detection circuit to detect the input voltage at the detection timing where the switching element is being turned off.

2. The switching power-supply device according to claim 1, wherein the integrated circuit further comprises
   a power source terminal for inputting a power-source voltage,
   wherein the timing control circuit causes the voltage detection circuit to detect the voltage in a period from when the power-source voltage inputted to the power source terminal exceeds a threshold to when the switching operation of periodically turning the switching element on-and-off is started.

3. The switching power-supply device according to claim 1, wherein the timing control circuit causes the voltage detection circuit to detect the voltage at a preset periodic timing in a period, during which the switching element has been turned off while the switching operation is periodically turning the switching element on-and-off.

4. The switching power-supply device according to claim 1, wherein the timing control circuit causes the voltage detection circuit to detect the voltage in a period, during which switching operation of periodically turning the switching element on-and-off has been stopped while the switching operation is being intermittently performed.

5. The switching power-supply device according to claim 1, wherein the timing control circuit controls the voltage detection circuit to not detect the input voltage at a timing where the switching element is being turned on.

* * * * *